United States Patent
Susnjara

(10) Patent No.: US 12,427,698 B2
(45) Date of Patent: Sep. 30, 2025

(54) METHOD OF CONSTRUCTING A METAL MOLD

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 18/411,760

(22) Filed: Jan. 12, 2024

(65) Prior Publication Data

US 2025/0229462 A1    Jul. 17, 2025

(51) Int. Cl.
| | | |
|---|---|---|
| *B29C 33/38* | (2006.01) | |
| *B29C 33/04* | (2006.01) | |
| *B29C 33/10* | (2006.01) | |
| *B33Y 10/00* | (2015.01) | |
| *B33Y 80/00* | (2015.01) | |

(52) U.S. Cl.
CPC .......... *B29C 33/3842* (2013.01); *B29C 33/04* (2013.01); *B29C 33/10* (2013.01); *B33Y 10/00* (2014.12); *B33Y 80/00* (2014.12); *B29K 2905/00* (2013.01)

(58) Field of Classification Search
CPC ...... B29C 33/3842; B29C 33/10; B29C 33/04
See application file for complete search history.

(56) References Cited

U.S. PATENT DOCUMENTS

| | | | |
|---|---|---|---|
| 5,031,483 A | | 7/1991 | Weaver |
| 9,156,194 B2* | | 10/2015 | Ng ........................ B29C 33/448 |
| 9,833,986 B1* | | 12/2017 | Susnjara ................ B26D 5/005 |
| 9,902,113 B2* | | 2/2018 | Matsumoto ........... B29C 64/188 |
| 10,118,315 B1* | | 11/2018 | Cheng ................... B29C 33/424 |
| 10,821,652 B2 | | 11/2020 | Tobin et al. |
| 11,014,291 B1* | | 5/2021 | Susnjara ................ B29C 64/118 |
| 11,104,402 B1* | | 8/2021 | Susnjara ............. B29C 33/3842 |
| 11,207,808 B1* | | 12/2021 | Susnjara ................. B29C 64/10 |
| 11,345,081 B1* | | 5/2022 | Susnjara ............... B29C 64/147 |
| 11,541,584 B1* | | 1/2023 | Quinonez ........... B29C 45/2738 |
| 11,951,676 B2* | | 4/2024 | Anegawa ............... B29C 45/26 |

(Continued)

FOREIGN PATENT DOCUMENTS

EP    4461499 A1    11/2024

OTHER PUBLICATIONS

Marrett, D. (Oct. 25, 2023). Thermwood Unveils a New Additive Way to Make Metal Molds. Thermwood Corporation Blog. https://blog.thermwood.com/topic/cla.

(Continued)

*Primary Examiner* — Seyed Masoud Malekzadeh

(74) *Attorney, Agent, or Firm* — Bookoff McAndrews, PLLC

(57) ABSTRACT

A part formed by additive manufacturing includes a plurality of layers including a first layer and a second layer, the first layer and the second layer being stacked along a stacking direction, and a work surface formed on an upper surface of the first layer and an upper surface of the second layer. The part also includes a first through-hole formed in the first layer, a second through-hole formed in the second layer, the second through-hole being at least partially aligned with the first through-hole, and a wall extending from the first through-hole to the work surface.

20 Claims, 10 Drawing Sheets

(56) References Cited

U.S. PATENT DOCUMENTS

| | | | |
|---|---|---|---|
| 2007/0067977 A1 | 3/2007 | Manuel et al. | |
| 2009/0246436 A1* | 10/2009 | Gorin | B29C 64/141 |
| | | | 264/219 |
| 2013/0075575 A1* | 3/2013 | Abe | B33Y 10/00 |
| | | | 419/7 |
| 2013/0200546 A1 | 8/2013 | Lowney et al. | |
| 2014/0010908 A1* | 1/2014 | Matsumoto | B33Y 10/00 |
| | | | 425/470 |
| 2014/0272121 A1* | 9/2014 | Ng | B29C 33/3842 |
| | | | 427/133 |
| 2016/0193768 A1* | 7/2016 | Jenko | B23P 15/007 |
| | | | 419/53 |
| 2017/0182680 A1* | 6/2017 | England | B33Y 80/00 |
| 2017/0197337 A1* | 7/2017 | Liu | B29C 33/3842 |
| 2017/0333991 A1* | 11/2017 | Kanai | B33Y 80/00 |
| 2019/0001656 A1* | 1/2019 | Susnjara | B33Y 40/00 |
| 2022/0176620 A1* | 6/2022 | Anegawa | B29C 64/30 |

OTHER PUBLICATIONS

Office Action issued in corresponding application CA 3261547, issued May 1, 2025.
European Serach Report issued in corresponding European Application No. 25150616.8, mailed Jun. 23, 2025.

* cited by examiner

METHOD OF CONSTRUCTING A METAL MOLD

TECHNICAL FIELD

Aspects of the present disclosure relate to systems and methods for fabricating components. In some instances, aspects of the present disclosure relate to methods and systems for fabricating components (such as patterns, molds, similar products, and others) via techniques or processes that have similarities with 3D printing processes involving layering. These techniques or processes may enable, in at least some embodiments, production of lower-cost molds or tooling without the use of a 3D printer.

BACKGROUND

Additive manufacturing techniques and processes generally involve the buildup of one or more materials to make a net or near net shape (NNS) object, in contrast to subtractive manufacturing methods. Although "additive manufacturing" is an industry standard term (ASTM F2792), additive manufacturing encompasses manufacturing and prototyping techniques known under a variety of names, including freeform fabrication, 3D printing, rapid prototyping/tooling, etc.

Some additive manufacturing techniques use large-scale 3D printers that are capable of fabricating very large parts, molds, patterns, etc. These parts can be produced from fiber-reinforced thermoplastic materials, for example. One method of producing these parts utilizes a polymer extruder which generates a bead of molten thermoplastic material, beads of this material being added in sequence so that the part being produced one layer at a time. These layers can be modified and/or flattened into wider beads during this additive process using devices such as tamping plates, rollers, or the like. Using these approaches, sometimes referred to as 3D printing, the part is made slightly larger than desired. After the part cools and hardens, it is then machined to the final size and shape. The resulting part is generally a shell of a specific thickness and of the approximate size and shape desired.

Another type of additive manufacturing can be referred to as "cut layer" additive manufacturing. In some examples of cut layer additive manufacturing, pieces can be cut from porous material, stacked on top of one another, and attached together to create a part. In some cases, this part may be hollow, comprised of individual pieces that are formed as narrow beads that, when stacked together, create a shell or wall around the outside shape of the desired part. In some approaches, a shell or wall is built from a porous material and infused with a catalyzed thermoset liquid. The liquid cures to produce a rigid composite part reinforced with the porous material.

There are times, however, when it is desirable to produce a part from non-porous material such as a metal (e.g., aluminum). Examples of potential applications for such a part include industrial molds and tooling for use in plastic molding processes such as thermoforming, blow molding, rotational molding, and reaction injection molding. In general, nonporous molds, such as aluminum molds, can be desirable for these applications, provided that the nonporous (e.g., aluminum) molds have a suitable cost and can be produced in an appropriate period of time.

One reason that aluminum or other nonporous materials that, while having desirable properties, are not used for at least some applications, such as molds and tooling, is that these relative large parts involve use of large blocks of material and significant time to remove (e.g., machine away) excess material to produce the desired cavity shape of the mold. This is especially true of large, deep parts where more than half the initial material may need to be removed to achieve the final part geometry desired.

One feature that is beneficial for sustained production in thermoforming is the ability to control the temperature of the mold face. In particular, temperature is controlled such that the temperature is appropriately warm, allowing a heat-softened thermoplastic sheet to be forced firmly against the mold face without the risk of the sheet cooling and hardening prematurely. The temperature should also be sufficiently cool, such that once the heat-softened thermoplastic sheet is in full contact with the mold, the sheet can cool sufficiently to retain its shape when removed from the mold.

The temperature at which this process works properly may be different for different formulations of thermoplastic sheet. For this reason, it is generally beneficial for the temperature of the mold face to be properly controlled. This can be performed by attaching metal tubes to the underside of the mold face and circulating temperature-controlled liquid through the tubes. This approach requires contact between the metal tubes and the underside of the mold face, something that can be difficult to achieve.

When a mold is produced using cast aluminum, cooling tubes can be incorporated inside the casting itself. While beneficial, processes for achieving such a structure are challenging (e.g., due to manufacturing inaccuracies). Also, it can be difficult to maintain a consistent distance between the cast-in lines and the mold face.

In some approaches, channels for temperature-controlled liquid are drilled into the mold body from the outside. However, such holes are typically drilled in a straight line, restricting placement flexibility. Also, the depth at which a hole is bored can be limited to the length of the drill bit. In large molds, drill bits or other tools may be insufficient in length to form an operable fluid channel.

It can also be difficult to produce large aluminum mold castings without the formation of voids or pores. However, voids and pores can result in flaws in the mold surface which unacceptably distort or mark the surface of the part being formed.

Another aspect desired for sustained production is the ability to pull and control vacuum through the mold when making a part with the mold. The amount of vacuum (e.g., the vacuum force) is determined by the maximum size of hole that can be used without creating distortions, such as marks, on face of the plastic part, resulting in a limiting design constraint. The placement of the vacuum holes can also be difficult due to the need to ensure the vacuum holes are not drilled through a coolant line.

SUMMARY

Aspects of the present disclosure relate to, among other things, methods and apparatus for fabricating components via layering techniques. Each of the aspects disclosed herein may include one or more of the features described in connection with any of the other disclosed aspects. An exemplary object of this disclosure is a method of constructing a molds and/or tools for plastic production, the molds or tools being formed of nonporous material, such as metal.

In some aspects of the present disclosure, methods of producing a part (e.g., molds for plastic processing) involve Cut Layer additive manufacturing. Cut Layer additive manufacturing methods involve stacking layers (e.g., metal layers such as aluminum) onto each other and permanently attaching the layers to each other. Typically, such layers are formed by one or a plurality of layer segments which are stacked and attached to each other to form relatively narrow walls. These walls may be, for example, about 1.0 to about 4.0 inches thick. Cut Layer additive manufacturing can be used to fabricate relatively large structures using a minimum amount of material.

Molds are an example of a relatively large structure that can be formed with cut Layer additive manufacturing. An important portion of a mold is the face of the mold that impacts the final part. The mold face typically has a thickness of a couple of inches thick (e.g., 1.0 inches, 2.0 inches, 3.0 inches, or 4.0 inches) and may be supported by stand-offs integrated into the structure of the mold itself.

Openings may be machined into the structure of the mold face. For example, openings are formed by machining holes and slots in each of the layers that make up the mold face. Once the layers of the mold face are attached together, the holes or slots align, connect, or otherwise match up, creating channels through which temperature-controlled liquid can be circulated in the completed mold.

Holes may be bored from the bottom of the mold face structure and into the closed channels that were previously machined in the mold face. The holes bored from the bottom of the mold face may allow access to one of the channels. By boring a hole in each end of a channel, temperature-controlled liquid may be introduced into one end of the channel and removed from the other end, forming a circuit within which the temperature-controlled liquid may circulate, controlling the temperature of the mold face in proximity to the channel. The ability of the liquid to circulate within the mold face structure improves thermal heat transfer in comparison with other approaches to mold temperature control.

A corresponding process can be used to create a chamber within the mold face itself into which vacuum can be applied. This may be performed by boring a hole from the bottom of the mold face structure into a chamber proximate the mold face.

Thin slots may be machined between layers at the mold face. These slots may extend into the vacuum chamber to channel air from the mold face toward a vacuum source (e.g., a vacuum pump) during processing. As the depth of the vacuum slot can be accurately controlled, it is possible to create a path to evacuate the air trapped between the heated softened thermoplastic sheet and the mold face more rapidly. Slots connecting to vacuum chambers may be thinner in width than a typical vacuum hole but relatively long, and thereby can evacuate air more rapidly without marking the surface of the molded part. Were drilled vacuum holes instead used to achieve a comparable air evacuation rate, such holes would need to be so large that they could raise the risk of marking the molded surface of the resulting part.

In one aspect, a part that may be formed by additive manufacturing includes a plurality of layers including a first layer and a second layer, the first layer and the second layer being stacked along a stacking direction, and a work surface formed on an upper surface of the first layer and an upper surface of the second layer. The part may also include a first through-hole formed in the first layer, a second through-hole formed in the second layer, the second through-hole being at least partially aligned with the first through-hole, and a wall extending from the first through-hole to the work surface.

In another aspect, a layer of a mold formed by additive manufacturing may include an upper side, a lower side, a front side, a rear side, and a portion of a mold face on the upper side. The layer may also include a portion of a first coolant channel extending through the front side and through the rear side and a wall formed of metal material extending from the first coolant channel to the mold face.

In yet another aspect, an additive manufacturing method may include removing material from a mass of metal material to form a plurality of layers of a part, forming through-holes in the layers, and stacking the layers along a stacking direction and connecting the layers to each other. The layers, when stacked, may form a work surface. The method may further include aligning the through-holes to form a channel and a wall, the wall extending from the channels to the work surface.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating multiple components via layering techniques. Specifically, the methods and apparatus described herein comprise a method of constructing metal molds and tools for plastic production, as well as other parts. In some aspects, instead of machining a mold from a solid block of material, a mold blank is assembled by stacking parts (e.g., layers or layer segments), these layer segments having been cut from a mass of material, such as one or more sheets of the material. In some aspects, the material used to form the layers or layer segments may be a porous material, such as medium-density fiberboard (MDF) or a solid, non-porous material, such as aluminum or another metal.

Figure 1:
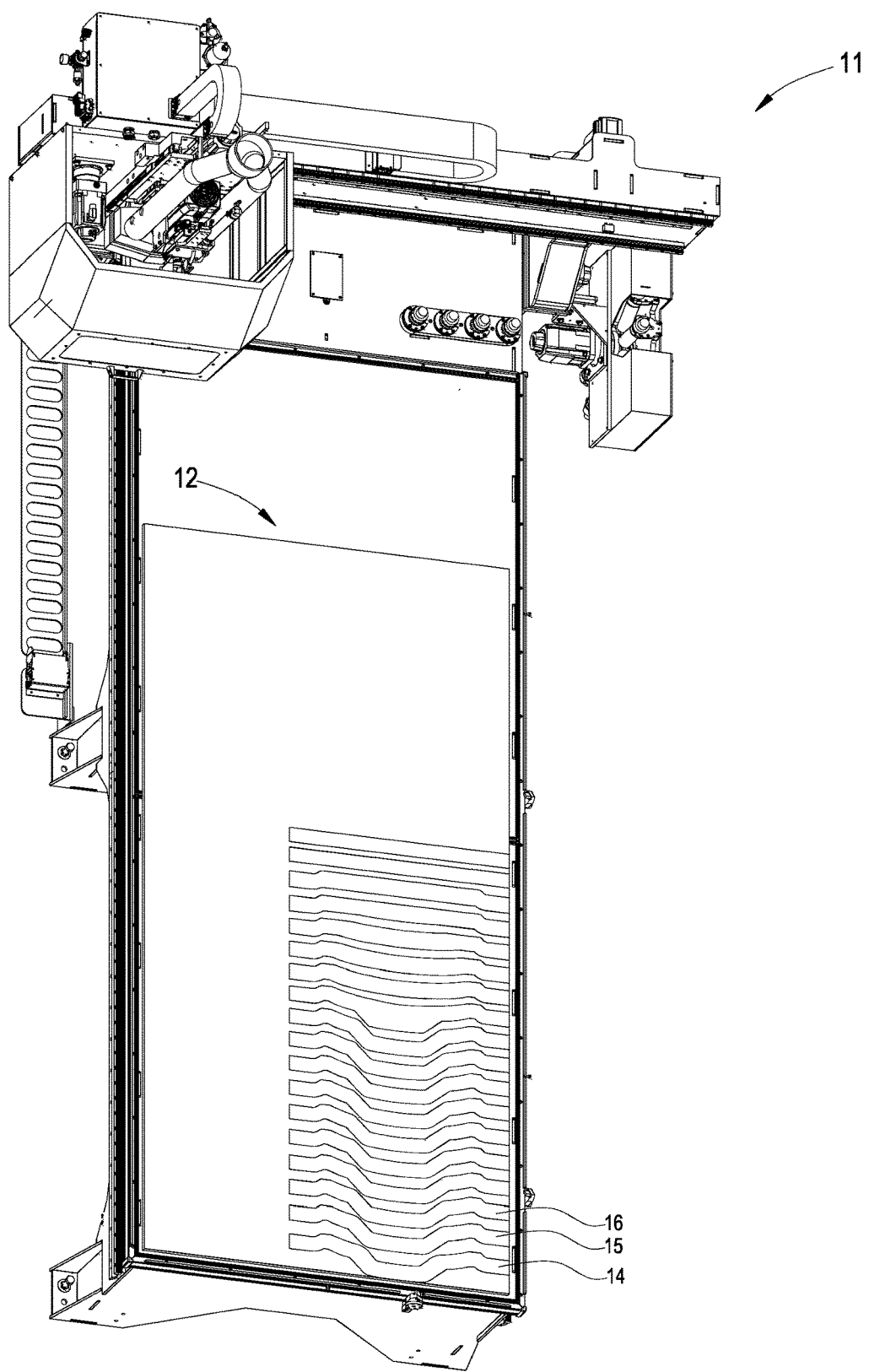
FIG. 1 is a perspective view of an exemplary material removing machine (e.g., CNC machine) operable to form layers by removing material from a sheet of material, according to an aspect of the present disclosure.

In aspects of the disclosure, a layered mold blank is produced. The layered mold blank may be the approximately the size and shape of the final mold that is desired to be formed from the mold blank. Once assembled, the layered mold blank may be accurately machined to the desired final size and shape. This produces a part that is similar in structure to parts formed by convention additive manufacturing processes, parts that are built in layers. However, the layers in this exemplary Cut Layer additive manufacturing process are cut from sheets of material 12 as shown in FIG. 1. A material-removing device, such as a CNC router 11, may be configured to perform high-speed machining or routing process to cut layers or layer segments from sheet of material 12. The layers and/or layer segments may be assembled, in contrast to layers that are applied to each other during a printing process (e.g., via a nozzle). Individual layer segments or layers 14, 15, and 16 may be fastened together in various methods, as described below.

Figure 2:
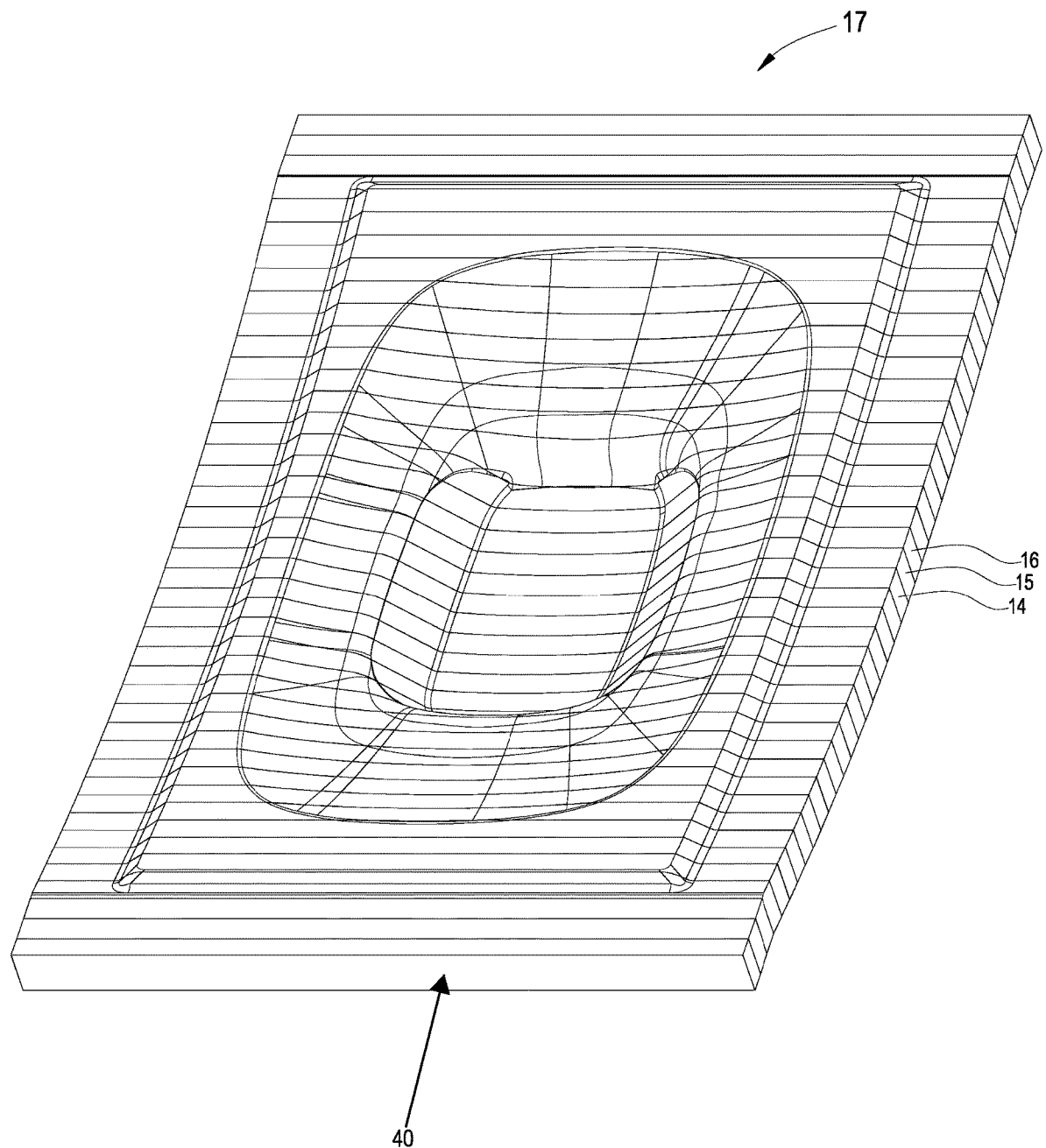
FIG. 2 is a perspective view of an exemplary part having a mold face, the part formed from a plurality of layers that were cut from the sheet of material and assembled together.

In utilizing the disclosed methods to produce molds for plastic processing, layers 14, 15, and 16 are stacked along a stacking direction 40 and permanently attached to each other resulting in layers with relatively narrow walls (e.g., about 1.0 to about 4.0 inches in thickness). As shown in FIG. 2, relatively large structures such as part 17 may be fabricated with a minimum amount of material by stacking layers in stacking direction 40. Layers 14, 15, and 16, and therefore part 17 may be formed by a metal material, such as aluminum. Layers 14, 15, and 16 may be adjacent to each other along the stacking direction 40.

Figure 3:
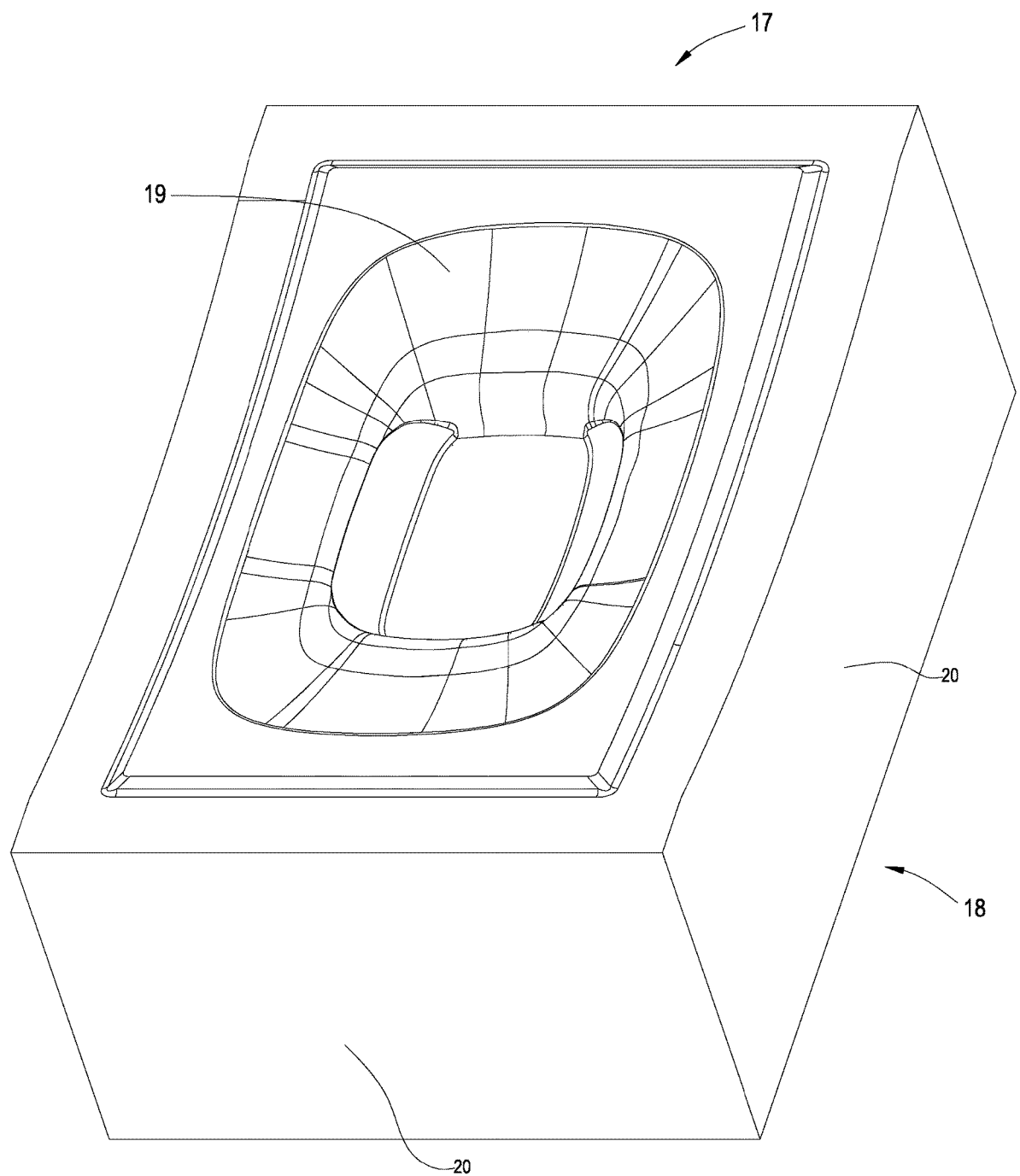
FIG. 3 is a perspective view of exemplary mold face with a supporting box structure attached to the mold face.

FIG. 3 illustrates an exemplary part 17 in the form of a mold, part 17 including a support structure in the form of a rectangular box 18 with a top surface 19 having the shape of the item to be produced (e.g., from plastic material) with the mold. Box 18 may be solid aluminum or a solid mass of other material for at least some parts or processes. However, box 18 may have a cavity formed in the base of box 18, when desired. The type of mold shown in FIG. 3 as an example of part 17 may be used in one or more plastic-part forming processes such as thermoforming, blow molding, rotational molding, reaction injection molding, and others.

Regardless of the process used to form an item with a mold 17, a useful part of mold 17 is mold face 19, as mold face 19 defines the size and shape of the item that will be produced. The remainder of mold 17, which may include most (e.g., greater than 50% as measured by weight or by volume) of the material of mold 17, is formed by a mold structure 20. Mold structure 20 may be used to support mold face 19 and mount mold face 19 to an appropriate molding machine.

Figure 4:
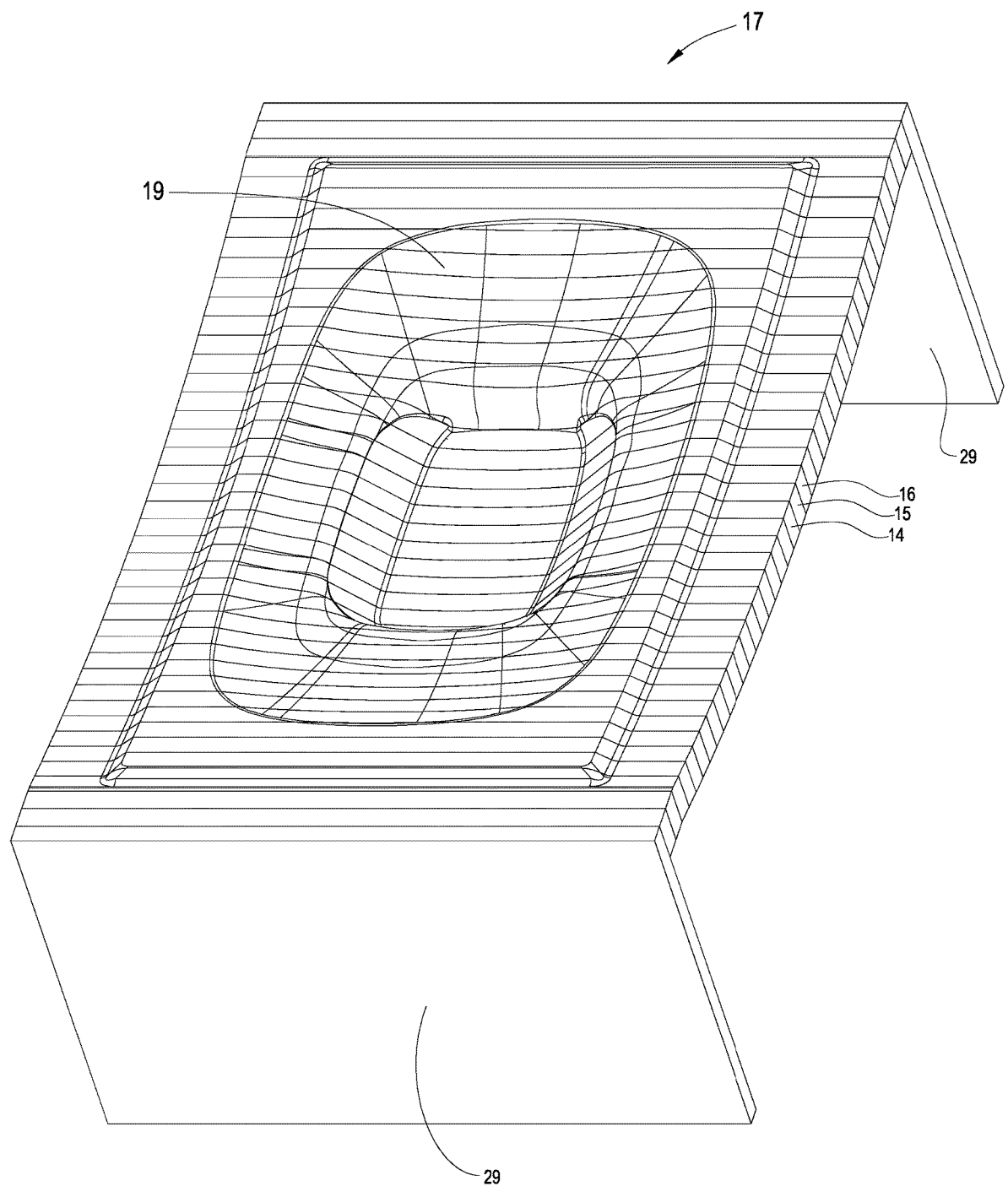
FIG. 4 is a perspective view of an exemplary mold face with legs or stand-offs acting as supports.

With reference to FIG. 4, as indicated above, a significant structure of mold 17 formed by Cut Layer additive manufacturing is mold face 19. Mold face 19 is an example of a work surface on an upper surface of part 17, a surface used to make parts in the example of a mold. Different types of parts 17 may have work surfaces that perform functions and/or that are decorative (e.g., structural members, connectors, patterned surfaces, aerodynamic shapes, etc.).

Mold face 19 may be about 1.0 to about 4.0 inches thick, and supported by one or more supports, such as box 18 or stand-offs 29. Stand-offs 29 may be formed as structures that are integrated into the structure of mold 17 itself. Alternatively, stand-offs 29 may be separate support structures that are fastened to one or more layers of part 17 in a manner that does not obstruct mold face 19.

As shown in FIG. 4, stand-offs 29 are formed as the initial and final layers (e.g., at ends of mold 17). These layers may have been formed by the above-described Cut Layer additive manufacturing process, in which machine 11 (FIG. 1) forms layers by removing material from a sheet. These layers, once assembled, each extend in a direction away (e.g., downward) from mold face 19 and create a support for mold 17.

In the example shown in FIG. 4, each stand-off 29 is formed from a single layer of mold 17, the stand-off forming one of two mounting legs on opposed ends of mold 17. If desired for a particular part 17, stand-offs 29 may instead each be formed by a plurality of adjacent layers, resulting in thicker stand-offs 29. Further, while two stand-offs 29 are shown, a single stand-off 29 (e.g., at a central portion of mold 17 or along an entire length of mold 17, as described below) may be used, or three or more stand-offs 29 may be present.

Figure 5:
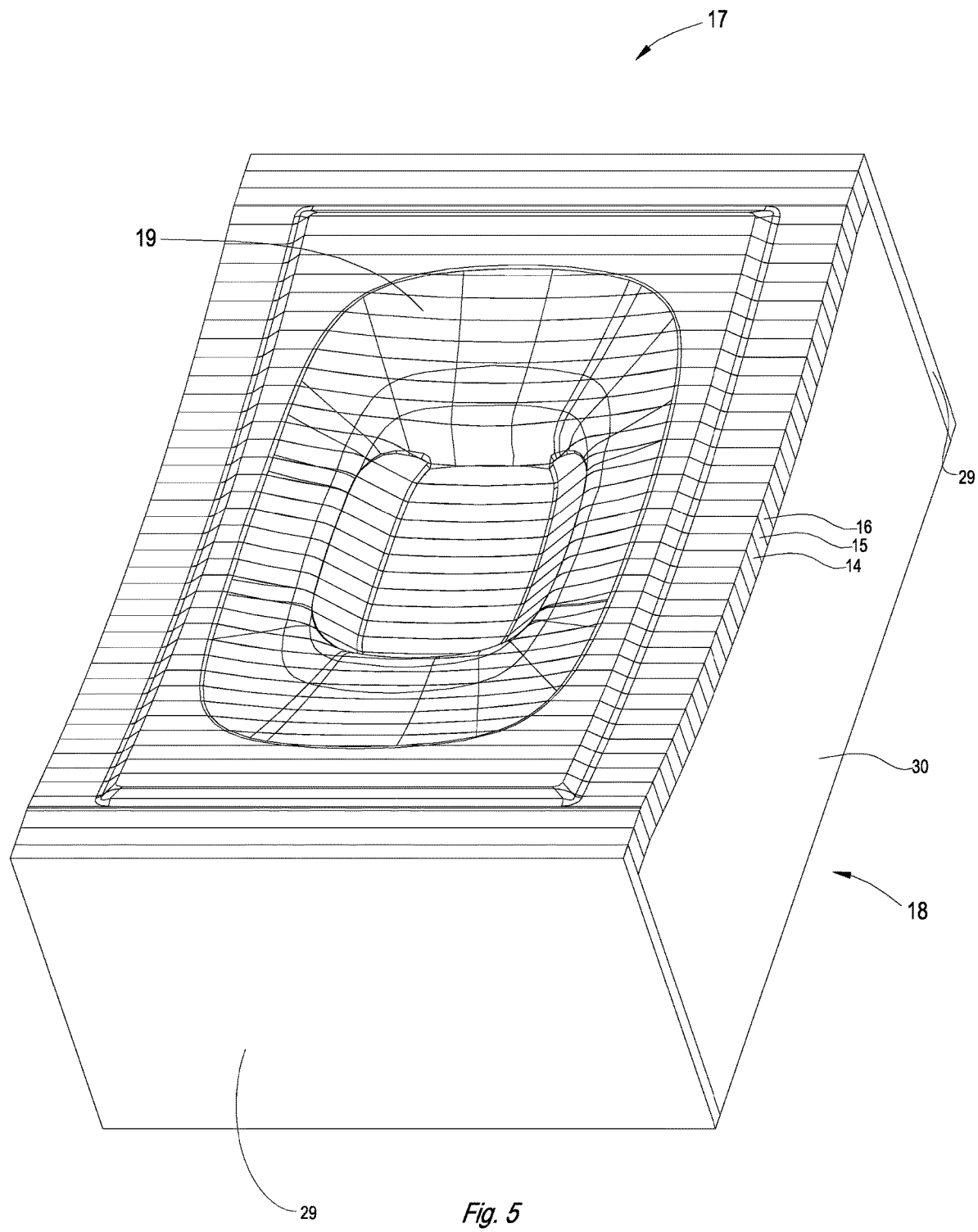
FIG. 5 is a perspective view of exemplary mold with material that forms an outer structure for support of the mold.
Figure 6:
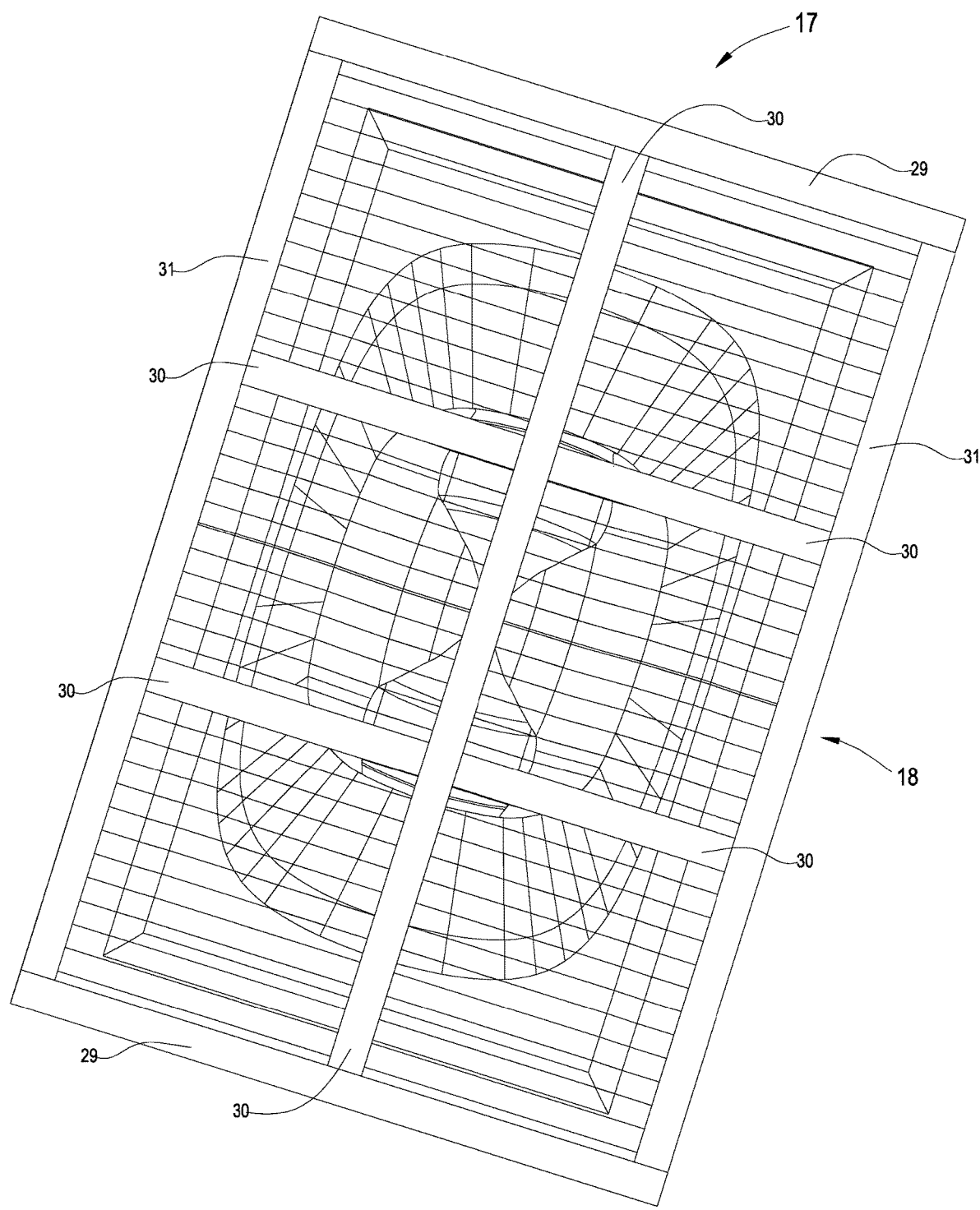
FIG. 6 is a perspective view of an exemplary mold showing an interior of material that forms a support structure of the mold.

With reference to FIGS. 5 and 6, stand-offs may be formed in the shape of a rectangular box 18. FIG. 5 is a view showing an outside of a mold with box 18 being formed at a bottom portion of the mold. The mold shown in FIG. 5 may be similar to the above-described molds formed by Cut Layer manufacturing, with box 18 having a rectangular shape, and with mold face 19 forming a top surface having the shape of the item to be produced, stand-offs 29 formed at opposite ends of the mold, side panels 31, and a bottom panel (not shown).

FIG. 6 is a bottom view showing a bottom end of box 18, as well as an interior of box 18 when box 18 is hollow. As shown in FIG. 6, box 18 may include a perimeter formed by stand-offs 29 and side panels 31. While this perimeter is shown as having a rectangular shape, other shapes (e.g., more complex geometric shapes, round shapes, etc.) are possible.

One or more internal reinforcing supports 30 may be secured within box 18 to provide additional support and rigidity. For example, one or more internal supports 30 may extend in a direction parallel to stand-offs 29 or parallel to side panels 31. Additionally or alternatively, supports 30 may extend at oblique angles with respect to stand-offs 29 and side panels 31. Each support 30 may extend generally parallel to a layer (two examples of this orientation being shown in FIG. 6) or perpendicular to one or more layers (one example of this orientation being shown in FIG. 6). While supports 30 may be formed at the bottom of mold 17, a support 30 may be located between the bottom end and top end of mold 17. A plurality of supports 30 may be included in box 18, including supports 30 at different heights. While a single support 30 may be located at a single height, supports 30 may instead be vertically-angled to span a plurality of heights, connecting opposite ends of a single layer or connecting different layers at different vertical heights.

Figure 7:
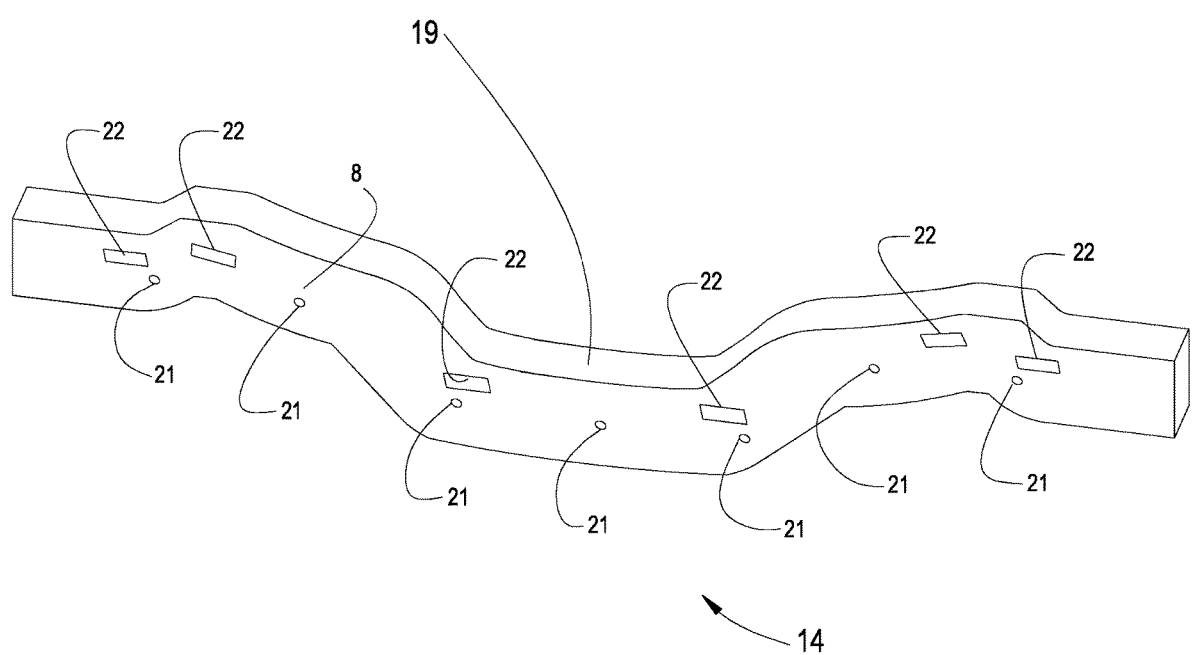
FIG. 7 is a bottom view of an exemplary layer of the mold, showing holes and slots configured for circulating temperature-controlled liquid and vacuum, according to an aspect of the present disclosure.

FIG. 7 shows a single example layer 14, layer 14 also being shown in FIGS. 1, 2, 4, and 5. Layer 14, formed by Cut Layer additive manufacturing with machine 11, may include structures to form a cooling and/or heating system within a part, when layer 14 is assembled with additional layers. These structures may be useful in a mold, as described above.

As shown in FIG. 7, an upper side of layer 14 forms at least a portion of face 19, while front and rear sides contain holes 21 and slots 22. A bottom side of layer 14 is opposite mold face 19 at the lower portion of FIG. 7.

Openings may be created in at least some of the layers (e.g., layer 14) that form a portion of mold face 19. Openings may also be formed in layers that are not part of mold face 19, if desired. These openings may be created by machining through-holes 21 and slots 22 (which, while being rectangular or having another shape, may also be considered through-holes).

Holes 21, slots 22, or both, may be machined in each layer that will form a portion of mold face 19, so that, when each layer is attached together, holes 21 at least partially align, or fully align, and overlap holes 21 of one or more other layers. Similarly, slots 22 may at least partially align, or fully align, and overlap slots 22 of one or more other layers. This allows holes 21 to create channels through which temperature-controlled liquid (e.g., coolant) may be circulated. The aligned slots 22 may facilitate the flow of vacuum through the slots 22 and away from mold face 19. In some aspects, holes 21 and slots 22 may be bored through the bottom of mold face 19. Once aligned, holes 21 and slots 22 may form respective channels that are isolated from each other, for the circulation of fluid and application of vacuum, respectively.

While circular holes 21 and rectangular slots 22 are shown in FIG. 7, other shapes are possible. For example, holes 21 may be formed as rectangular slots, or slots 22 may be formed as circular holes. Holes 21 and slots 22 may be formed by removing material with machine 11 as part of the process for removing material from sheet of material 12 to form layers and/or layer segments. For example, before layers 14, 15, and 16 are fully separated from the sheet of material 12, holes 21 and slots 22 may be formed in each appropriate layer.

Figure 8:
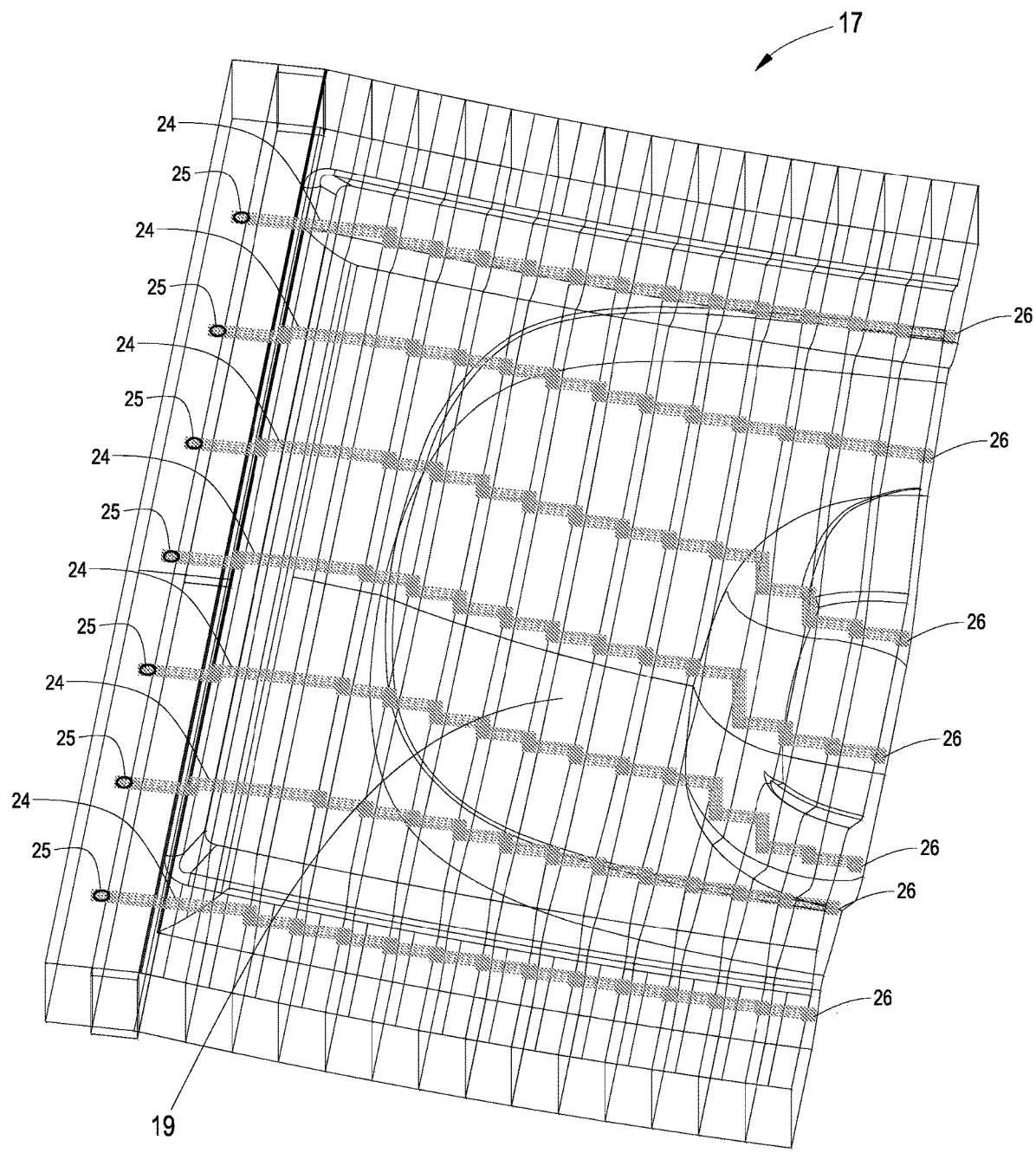
FIG. 8 is a wire frame illustration of a mold face showing paths of the holes for circulating temperature-controlled liquid.

FIG. 8 is a wireframe view of about half of part 17, in which a plurality of layers are assembled to form mold face 19. Each layer extends in a generally-vertical direction in FIG. 8, with individual layers being stacked together in a generally horizontal direction.

Seven coolant channels 24 are illustrated in FIG. 8, with each layer containing a portion of each of the seven channels 24. Each channel 24 begins at an entrance 25 and terminates at an exit 26. Between entrance 25 and exit 26, at least one channel may form a horizontally-extending portion (with regions of greater or lower height). Access to each channel 24 may be provided via a hole bored from the bottom of the part, such that the bore forms a portion of channel 24 that extends orthogonal to stacking direction 40 (FIG. 2). In particular, every entrance 25 and/or every exit 26 may bored through a bottom surface of the mold that is opposite to mold face 19 to form a downward-facing opening. A downward-facing opening may be formed by entrance 25 and/or exit 26. However, if desired, one or more entrances 25 and/or exits 26 may be formed in a side surface of a layer.

Temperature-controlled liquid (e.g., coolant, with "coolant" being used herein to refer to fluids for cooling, for heating, or for both cooling and heating) may be introduced into each channel 24 via a bore or hole (entrance 25) formed at an end of channel 24. The temperature-controlled fluid may be removed from each channel via an exit 26 on an opposite end of channel 24. Circulation of the temperature-controlled liquid may facilitate control of the temperature of mold face 19, which is in proximity to channels 24.

Channels 24 may be formed to follow the profile of mold face 19. As shown in FIG. 8, each channel 24 may extend in a direction that is generally aligned with a direction in which individual layers of part 17 are stacked and assembled. The height of one or more of channels 24 may increase and decrease to follow a profile defined by mold face 19. For example, some channels 24 in FIG. 8 are shown as increasing in height prior to decreasing in height in a direction beginning at entrance 25 and extending toward exit 26.

Channels 24 may be uniformly distributed (e.g., spaced apart), or may be clustered together. The distance between respective channels 24 may increase or decrease in different portions of part 17. For example, channels 24 may be closer to each other in an area of mold face 19 that is expected to experience greater heat (e.g., a central portion of mold face 19, or a portion of mold face 19 that is designed to receive a larger amount of material for molding), and spaced farther apart at portions of mold face 19 that experience less heat, or spaced farther apart at areas that do not include a portion of mold face 19.

The path of each channel 24, such as the paths shown in FIG. 8, may be difficult or impossible to form in a mold manufactured from a solid block of material. For example, channels 24 may extend in multiple different directions within part 17, such as the illustrated path in which each entrance 25 extends upward from a bottom surface of part 17, each exit 26 extends upward from a bottom surface of part 17, and portions of each channel 24 between entrance 25 and exit 26 follow a path generally perpendicular to entrance 25 and exit 26, these portions also having regions that extend upward or downward. The use of Cut Layer additive manufacturing techniques may therefore facilitate the formation of channels 24 that circulate liquid within the structure of mold face 19 itself. With channels 24 formed at this location, thermal heat transfer and control may be improved in comparison to other approaches for controlling mold temperature.

Figure 9:
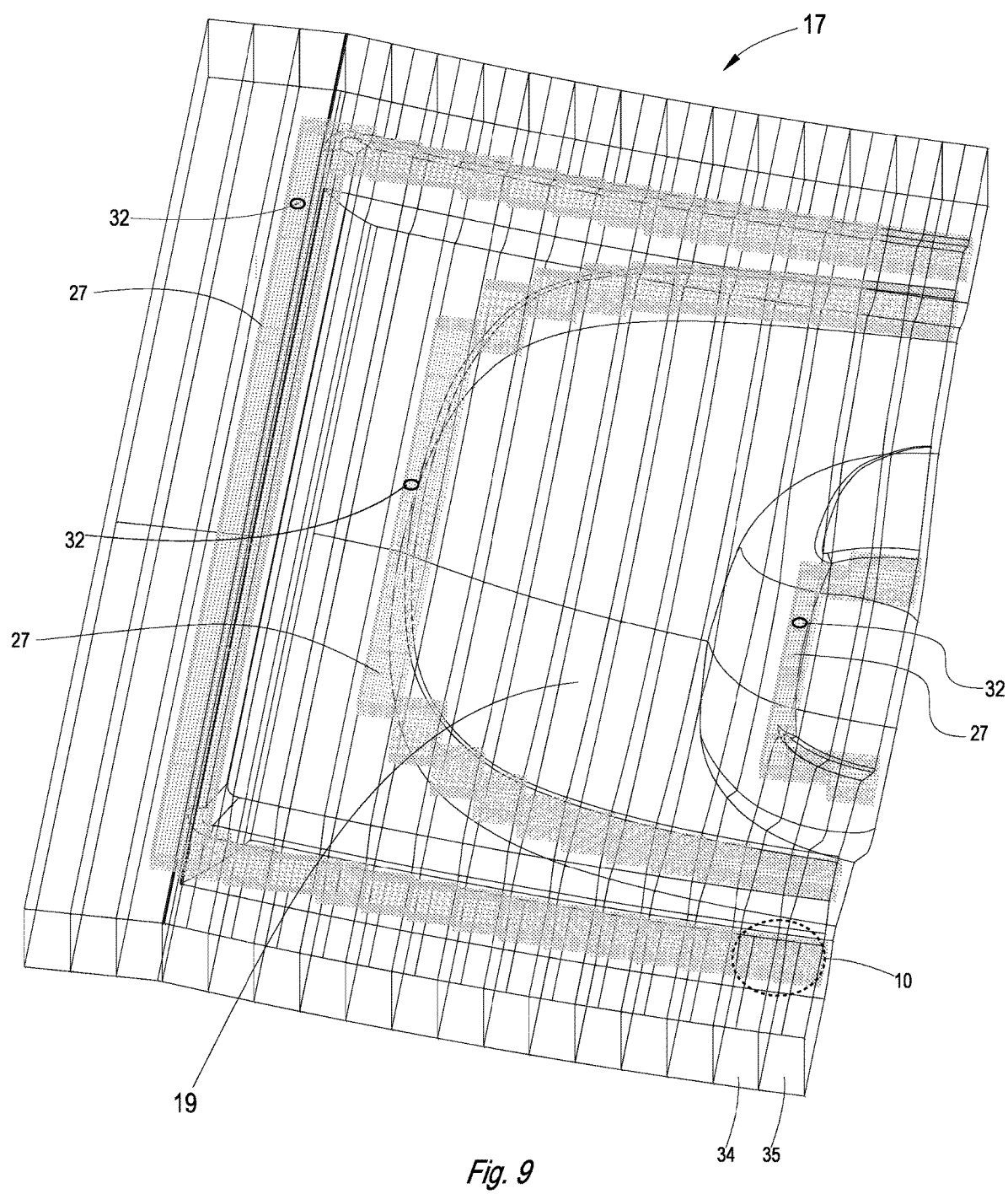
FIG. 9 is a wire frame illustration of an exemplary mold face showing the paths of the slots for vacuum.

As shown in the wireframe view of part 17 in FIG. 9 (about one half of part 17 being shown), Cut Layer additive manufacturing processes may be used to create a chamber 27 to which vacuum may be applied. Chamber 27 may be formed within mold face 19. Each chamber 27 may have a closed-loop path, about half of this path being shown in FIG. 9. The closed-loop path of chamber 27 may be connected to a bore at the bottom surface of part 17 to form a vacuum connection 32, with one or more openings formed, e.g., by slots, the openings allowing each chamber 27 to apply vacuum at a top surface of part 17, as described below.

Each connection 32 may extend through an outer surface of part 17 to connect chamber 27 to one or more vacuum pumps. This connection may be created by boring a hole (not shown) from the bottom of the structure of mold face 19 into a respective chamber 27.

Figure 10:
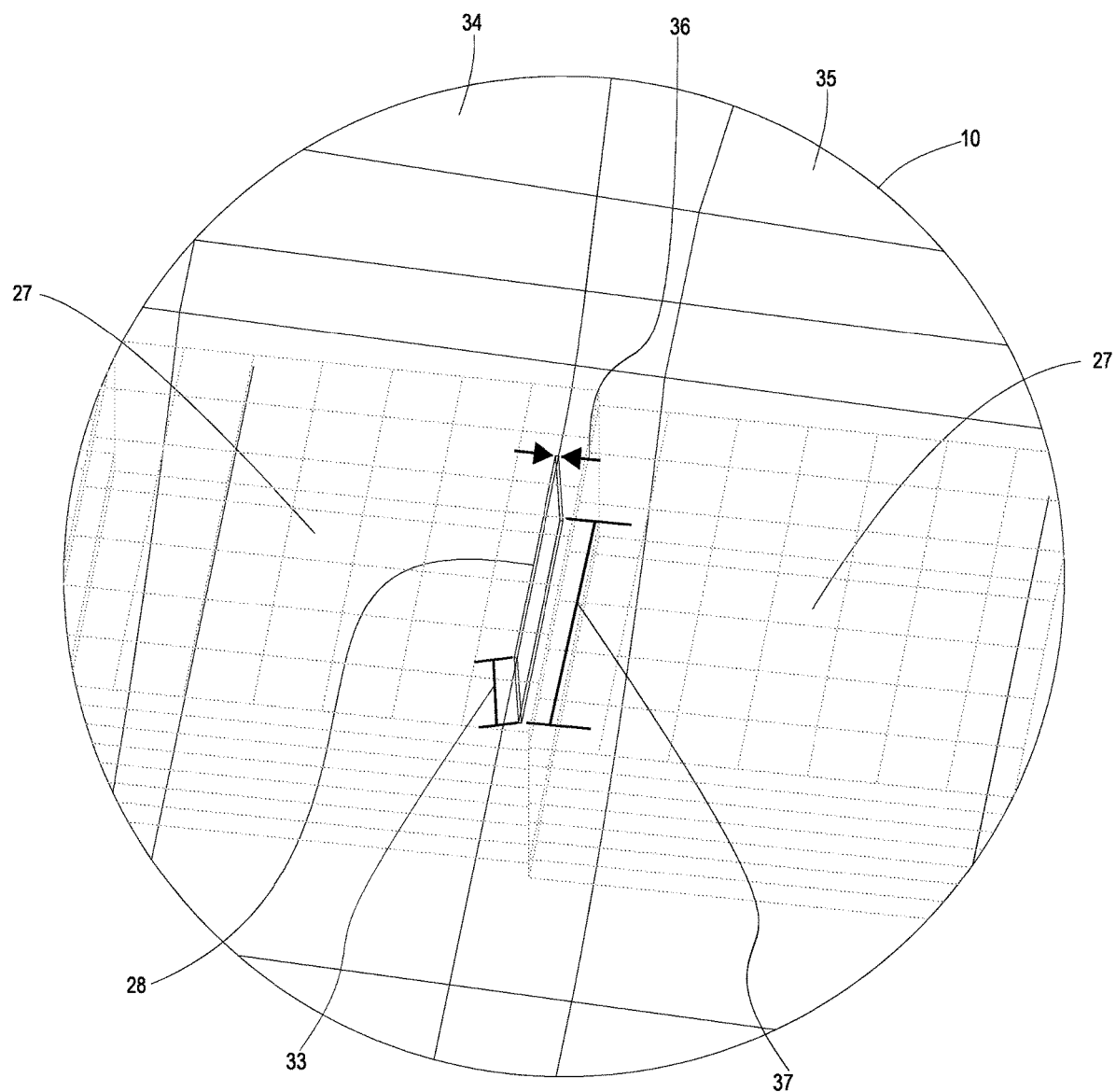
FIG. 10 is an enlarged wire frame illustration of the mold face showing a vacuum slot.

FIG. 10 is an enlarged view of portion 10 (FIG. 9) of part 17, portion 10 including a pair of abutting layers 34 and 35. Portion 10 of part 17 is representative of an example configuration in which chambers 27 are fluidly connected to mold face 19. As shown in FIG. 10, vacuum passages or slots 28 may be machined at the interface between layers 34 and 35 by removing material from an end face of layer 34, layer 35, or both layers 34 and 35. Therefore, slot 28 may be formed as a recess within layer 34 and/or layer 35. Slots 28 may have a depth 33, length 37, and width 36, length 37 being greater than depth 33 and greater than width 36. Slot 28 may extend downward from mold face 19 into vacuum chamber 27 to evacuate air from mold face 19 during processing of a plastic item manufactured with part 17. Thus, each slot 28 may form a narrow opening within mold face 19, the opening having width 36 and length 37.

The use of Cut Layer additive manufacturing may allow the depth 33 of vacuum slot 28 to be accurately controlled. Thus, it may be possible to create a path to evacuate air trapped between a heated softened thermoplastic sheet and mold face 19 more rapidly than in other processes.

Slot 28 may be thinner, as measured at width 36 (e.g., in a direction parallel to a direction 40, shown in FIG. 2, in which layers 34 and 35 are stacked) as compared to a vacuum hole diameter formed by other processes. Further, slot 28 may be relatively long, as measured along length 37, allowing the evacuation of air more rapidly than other methods, and without marking the surface of the molded item. For example, conventional processes of drilling vacuum holes with a similar air evacuation rate could result in marking the molded surface of the resulting item.

If desired, additional processing may be performed to part 17 to further prevent the formation of marks in a molded item, especially at separation lines formed between pairs of abutting layers. Additional processing may include coating surfaces of mold 17 with a wear-resistant material. This coating may be applied to mold face 19, for example. The coating may be a plasma sprayed metal, a ceramic, or a chemically-plated material (e.g., chromium applied by chrome plating). Coating processes may advantageously create a more wear resistant working surface, and may reduce or eliminate marks formed on a part by seams between layers. Also, the use of a coating on mold 17 may prevent abrasion caused by repeatedly forming items on a mold 17 made of aluminum or other nonporous material. This may improve longevity of mold 17, in particular for molds 17 used for tooling applications.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. A part formed by additive manufacturing, the part comprising:
   a plurality of layers including a first layer and a second layer, the first layer and the second layer being stacked along a stacking direction, wherein the first layer is adjacent to the second layer;
   a work surface including a face configured to define a size and shape of an object to be formed with the work surface, the work surface being formed on an upper surface of the first layer and on an upper surface of the second layer, wherein the work surface is continuous along the upper surface of the first layer and the upper surface of the second layer;
   a first through-hole formed in the first layer;
   a second through-hole formed in the second layer, the second through-hole being at least partially aligned with and in fluid communication with the first through-hole to form a continuous channel when the part is in an assembled configuration; and
   a wall extending from the first through-hole to the work surface,
   wherein the first through-hole and the second through-hole together form a portion of the continuous channel, the continuous channel being a fluid channel configured to circulate a coolant.

2. The part of claim 1, further including:
   a third through-hole formed in the first layer; and
   a fourth through-hole formed in the second layer, the third through-hole being at least partially aligned with the fourth through-hole.

3. The part of claim 1, further including:
   a third through-hole formed in the first layer; and
   a fourth through-hole formed in the second layer, the third through-hole being at least partially aligned with the fourth through-hole,
   wherein the first through-hole and the second through-hole each have a first shape and the third through-hole and the fourth through-hole each have a second shape that is different than the first shape.

4. The part of claim 1, further including:
   a third through-hole formed in the first layer;
   a fourth through-hole formed in the second layer, the third through-hole being at least partially aligned with the fourth through-hole; and
   an opening in the work surface, the opening being connected to the third through-hole and the fourth through-hole.

5. The part of claim 1, further including:
   a third through-hole formed in the first layer;
   a fourth through-hole formed in the second layer, the third through-hole being at least partially aligned with the fourth through-hole; and
   an opening in the work surface, the opening being connected to the third through-hole and the fourth through-hole,
   wherein the opening is formed in a shape of a slot having a length that is larger than a width of the slot.

6. The part of claim 1, wherein the first through-hole and the second through-hole form a horizontally-extending portion of the continuous channel, the continuous channel having a downward-facing opening.

7. The part of claim 1, wherein the first through-hole and the second through-hole form a horizontally-extending portion of the continuous channel, the continuous channel having a downward-facing opening, and wherein the continuous channel is a first coolant channel and the part includes a second coolant channel, the second coolant channel extending through the first layer and through the second layer.

8. The part of claim 1, wherein the part is a mold, the mold including a support structure.

9. The part of claim 1, wherein the part is a mold, the mold including a support structure, and wherein the support structure is hollow and includes an internal support.

10. The part of claim 1, further including:
    a third layer, the third layer comprising:
      an upper side;
      a lower side;
      a front side;
      a rear side;
      a portion of a mold face formed on the upper side;
      a portion of the first continuous channel extending through the front side and through the rear side; and
      a wall formed of metal material extending from the first coolant channel to the mold face.

11. The part of claim 1, further including:
    a third layer, the third layer comprising:
      an upper side;
      a lower side;
      a front side;
      a rear side;
      a portion of a mold face formed on the upper side;
      a portion of the first continuous channel extending through the front side and through the rear side;
      a wall formed of metal material extending from the first coolant channel to the mold face; and
    a portion of a second continuous channel extending through the front side and through the rear side of the third layer.

12. The part of claim 1, further including:
    a third layer, the third layer comprising:
      an upper side;
      a lower side;
      a front side;
      a rear side;
      a portion of a mold face formed on the upper side;

a portion of the first continuous channel extending through the front side and through the rear side;
a wall formed of metal material extending from the first coolant channel to the mold face; and
a portion of a vacuum chamber extending through the front side and through the rear side of the third layer.

13. The part of claim 1, further including:
a third layer, the third layer comprising:
an upper side;
a lower side;
a front side;
a rear side;
a portion of a mold face formed on the upper side;
a portion of the first continuous channel extending through the front side and through the rear side;
a wall formed of metal material extending from the first coolant channel to the mold face;
a portion of a vacuum chamber extending through the front side and through the rear side of the third layer; and
a recess formed by material removed from the front side or the rear side of the third layer, the recess extending from the mold face to the vacuum chamber.

14. The part of claim 1, further including:
a third layer, the third layer comprising:
an upper side;
a lower side;
a front side;
a rear side;
a portion of a mold face formed on the upper side;
a portion of the first continuous channel extending through the front side and through the rear side; and
a wall formed of metal material extending from the first coolant channel to the mold face,
wherein the mold face extends from the front side to the rear side of the third layer.

15. A part for forming a molded part, the part comprising:
a plurality of layers, including a first layer and a second layer, the first layer and the second layer being stacked along a stacking direction, wherein the first layer is adjacent to the second layer;
a mold face configured to define a shape of an object to be formed, the mold face formed on an upper surface of the first layer and an upper surface of the second layer, wherein the mold face is continuous along the upper surface of the first layer and the upper surface of the second layer;
a first channel formed in the first layer;
a second channel formed in the second layer, the second channel at least partially aligned with the first channel, the first and second channels together forming a coolant channel;
a wall extending from the first channel to the mold face; and
a vacuum slot formed between the first layer and the second layer, the vacuum slot extending from the mold face to a vacuum chamber, the vacuum chamber formed in the layers and connected to a vacuum source.

16. The part of claim 15, wherein the coolant channel extends in a horizontal direction relative to the stacking direction and includes at least one downward-facing opening formed in the first layer, the opening providing access to the coolant channel for circulation of coolant.

17. The part of claim 15, wherein the coolant channel extends in a horizontal direction relative to the stacking direction and includes at least one downward-facing opening formed in the first layer, wherein the coolant channel extends from an entrance positioned at a first end of the mold to an exit positioned at an opposite end of the mold.

18. The part of claim 15, further comprising a plurality of support structures extending from the mold face to a lower surface of the mold, the support structures formed by one or more layers of the plurality of layers and integrated into the mold.

19. The part of claim 15, wherein the part further comprises a support structure, and wherein the support structure is hollow and includes an internal support.

20. The part of claim 15, wherein the wherein vacuum slot includes a length that is larger than a width of the slot.

* * * * *